(12) United States Patent
Onishi et al.

(10) Patent No.: US 6,948,871 B1
(45) Date of Patent: Sep. 27, 2005

(54) IMAGE PROCESSING DEVICE

(75) Inventors: Hiroaki Onishi, Kyoto (JP); Hisayoshi Fujimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/890,634

(22) PCT Filed: Feb. 4, 2000

(86) PCT No.: PCT/JP00/00635

§ 371 (c)(1),
(2), (4) Date: Aug. 3, 2001

(87) PCT Pub. No.: WO00/48385

PCT Pub. Date: Aug. 17, 2000

(30) Foreign Application Priority Data

Feb. 15, 1999 (JP) .................................. 11-035720

(51) Int. Cl.[7] ........................... H04N 1/00; H04N 1/31; B41J 15/04

(52) U.S. Cl. ................. 400/679; 400/120.01; 347/218; 358/296

(58) Field of Search ................................. 358/498, 296; 400/185, 186, 187, 679, 120.01; 347/218

(56) References Cited

U.S. PATENT DOCUMENTS

| 5,206,737 | A | * | 4/1993 | Sugiyama | .................... | 358/296 |
| 5,226,639 | A | * | 7/1993 | Kida et al. | ................... | 271/109 |
| 5,523,858 | A | * | 6/1996 | Yamada et al. | ............. | 358/412 |
| 5,854,696 | A | * | 12/1998 | Yun | ........................... | 358/498 |
| 6,178,863 | B1 | * | 1/2001 | Kobayashi et al. | ........... | 83/649 |

FOREIGN PATENT DOCUMENTS

| JP | 05-294525 | 11/1993 |
| JP | 06-178042 | 6/1994 |

* cited by examiner

*Primary Examiner*—Daniel J. Colilla
(74) *Attorney, Agent, or Firm*—Hamre, Schumann, Mueller & Larson, P.C.

(57) ABSTRACT

The image processing device (A) comprises an original-document platen roller ($P_1$) that has a first driven gear ($G_1$) and is for transporting an original document (D), a recording-paper platen roller ($P_2$) that has a second driven gear ($G_2$) and is for transporting recording paper (K), and a drive mechanism (2) that has a first movable gear ($a_1$), a second movable gear ($a_2$), and a drive source (M) and is for transmitting a drive force generated by this drive source (M) to the first driven gear ($G_1$) and second driven gear ($G_2$). First movable gear ($a_1$) is provided so as to be capable of engaging directly with first driven gear ($G_1$), and second movable gear ($a_2$) is provided so as to be capable of engaging directly with second driven gear ($G_2$).

12 Claims, 5 Drawing Sheets

IMAGE PROCESSING DEVICE

TECHNICAL FIELD

The present invention relates to an image processing device, more particularly to an image processing device that comprises an original-document platen roller that is for transporting an original document, and a recording-paper platen roller that is for transporting recording paper.

BACKGROUND ART

An image processing device that is capable of performing image-read processing and image-print processing, such as a facsimile device, for example, typically comprises two types of platen roller. One such platen roller is an original-document platen roller that is for transporting an original document that has an image to be read, and that is actuated when image-read processing takes place. The other platen roller is a recording-paper platen roller that is for transporting recording paper which is to be subjected to print-processing, and that is actuated when image-print processing takes place. The use of separate drive sources for the rotation of each of these two platen rollers is unfavorable on account of the high costs involved. Consequently, some conventional image processing devices, as shown in FIG. 7, are constructed such that two platen rollers are rotated through the use of one drive source.

The conventional image processing device shown in FIG. 7 comprises an image-read head 80, an original-document platen roller $P_1$ that is provided facing this image-read head 80, a print head 81, a recording-paper platen roller $P_2$ that is provided facing this print head 81, and a drive mechanism 7 for drive-rotating the two platen rollers $P_1$, $P_2$.

The drive mechanism 7 comprises a single motor M1, a driving gear 84 provided on the drive shaft of motor M1, a large-diameter gear 85, two movable gears 71, 72, and intermediate gears Ga to Gf. The large-diameter gear 85 is caused to rotate by driving gear 84. The two movable gears 71, 72 are driven by engagement with large-diameter gear 85. Since displacement of movable gears 71, 72 is required, in addition to rotation of same, these can be displaced, in the circumferential direction of large-diameter gear 85 as respectively shown by arrows Na, Nb, by the movement of a mechanism beyond the view of the figure in which another motor (not shown) constitutes a drive source.

According to a constitution of this kind, engagement of movable gear 71 with intermediate gear Ga enables original-document platen roller $P_1$ to rotate via intermediate gear Gb, and original document D is thereby transported. Meanwhile, engagement of movable gear 72 with intermediate gear Gc enables recording-paper platen roller $P_2$ to rotate via intermediate gears Gc to Gf, and recording paper K is thereby transported. At the same time as movable gear 71 engages with intermediate gear Ga, movable gear 72 engages with intermediate gear Gc, and simultaneous rotation of original-document platen roller $P_1$ and recording-paper platen roller $P_2$ is possible. With regard thereto, when either one of movable gear 71 and movable gear 72 is moved away from either intermediate gear Ga or intermediate gear Gc, as shown by the virtual displacement lines in FIG. 7, either one of original-document platen roller $P_1$ and recording-paper platen roller $P_2$ can be rotated independently of the other. It thus becomes possible to perform read-processing of the image of original document D, and image-print processing on recording paper K, separately or simultaneously.

However, the conventional image processing device must also comprise a mechanism (not shown) for displacing movable gears 71, 72 as described above. Furthermore, in order to drive this mechanism, another motor (not shown) must be provided in addition to motor M1. In addition, since, in a conventional image processing device, an image-read head 80 and print head 81 are provided separately, an original-document print head and recording-paper print head, that are correspondingly provided, are arranged separately from another. As a result, in order to transmit the rotational force of the two movable gears 71, 72 to original-document platen roller $P_1$ and recording-paper platen roller $P_2$, respectively, it is necessary to respectively provide individual intermediate gear paths Ga to Gb and Gc to Gf.

As described above, conventionally, in order to realize selective drive of original-document platen roller $P_1$ and recording-paper platen roller $P_2$ by means of movable gears 71, 72, a plurality of mechanisms have been required for the device and, as a result, a multiplicity of gears. However, this has resulted in a cumbersome overall constitution of the device and high manufacturing costs.

DISCLOSURE OF THE INVENTION

It is therefore an object of the present invention to simplify the construction of the mechanism for rotating the original-document platen roller $P_1$ and recording-paper platen roller $P_2$ and thus reduce manufacturing costs thereof.

An image processing device is provided according to a first aspect of the present invention. This image processing device comprises an original-document platen roller that has a first driven gear and is for transporting an original document, a recording-paper platen roller that has a second driven gear and is for transporting recording paper, and a drive mechanism that has a first movable gear, a second movable gear, and a drive source and is for transmitting a drive force generated by this drive source to the first driven gear and second driven gear, characterized in that the first movable gear is provided so as to be capable of engaging directly with the first driven gear, and the second movable gear is provided so as to be capable of engaging directly with the second driven gear.

In the present invention, the two movable gears of the drive mechanism are provided so as to be capable of engaging directly with the original-document platen roller and recording-paper platen roller, not as intermediate gears of the drive mechanism but as distal gears thereof. According to such a constitution, the motive power transmission path of the drive mechanism is not obstructed at any point therealong due to the displacement of the two movable gears, meaning that a mechanism that permits displacement of the two movable gears can be constructed inside the drive mechanism in such a manner that substantially the entire capacity of the drive mechanism is utilized. In other words, in order to achieve the transmission of motive power to the two platen rollers and displacement of the two movable gears, a common motor, gears and other components can be utilized. Further, since the first movable gear and second movable gear are provided so as to be capable of engaging directly with the original-document platen roller and recording-paper platen roller respectively, it is not necessary to provide a multiplicity of gears therebetween as has been the case conventionally. The overall construction of the device is therefore simple and the total number of gears required by the device is small, which in turn permits a reduction in the manufacturing costs thereof.

A preferred embodiment of the present invention further comprises an image read/write integrated head in which a plurality of photoreceptors for reading an original-document image, and a plurality of printing elements for performing image printing are mounted on the same side of the same base plate. The original-document platen roller is provided facing the plurality of photoreceptors, and the recording-paper platen roller is provided facing the plurality of printing elements. With a constitution of this kind, the original-document platen roller and recording-paper platen roller can be provided close to one another. Consequently, due to the narrowing of the interval between the two movable gears of the drive mechanism, miniaturization of the drive mechanism itself and simplification of the construction thereof are possible.

The drive mechanism preferably comprises a switching mechanism that selectively causes the first movable gear and the second movable gear to engage with the first driven gear and the second driven gear, respectively. With a constitution of this kind it becomes possible to selectively perform rotation of the original-document platen roller and recording-paper platen roller.

The switching mechanism preferably permits a mode in which the first movable gear is caused to engage with the first driven gear, and the second movable gear is simultaneously moved away from the second driven gear. With a constitution of this kind it becomes possible for the image processing device of the present invention to selectively perform only read-processing of an original-document image.

The switching mechanism preferably also permits a mode in which the second movable gear is caused to engage with the second driven gear, and the first movable gear is simultaneously moved away from the first driven gear. With a constitution of this kind it becomes possible for the image processing device of the present invention to selectively perform only print-processing on the recording paper.

The switching mechanism preferably also permits a mode in which the first movable gear is caused to engage with the first driven gear, and the second movable gear is simultaneously caused to engage with the second driven gear. With a constitution of this kind it becomes possible for the image processing device of the present invention to simultaneously perform read-processing of an original-document image and print-processing on the recording paper.

The switching mechanism preferably comprises a cam that has a cam gear for receiving drive force from the drive source; a first arm that is provided so as to be capable of coming into contact with the cam and on which the first movable gear is mounted; a second arm that is provided so as to be capable of coming into contact with the cam and on which the second movable gear is mounted. The cam establishes the position of the first movable gear and second movable gear through contact with the first arm and the second arm. With a constitution of this kind, by causing the cam to rotate, it is possible to change the position of the first movable gear and second movable gear via the first arm and the second arm, respectively.

The first arm is preferably capable of swinging about an axis formed by a shaft portion, and has a first end portion, on which the first movable gear is provided, and a second end portion that is capable of coming into contact with the cam.

The second arm is preferably capable of swinging about an axis formed by a shaft portion, and has a first end portion, on which the second movable gear is provided, and a second end portion that is capable of coming into contact with the cam.

The second end portion of the second arm preferably remains in continual contact with the cam by means of spring bias.

The drive source is preferably a motor that has a drive shaft capable of forward and reverse rotation, and the switching mechanism causes the cam to rotate, without transmitting drive force of the motor to the cam gear during forward rotation of the drive shaft, or transmitting the drive force to the cam gear during reverse rotation of the drive shaft. With a constitution of this kind, it is possible for a single, rotating motor to perform not only the rotational movement of the original-document platen roller and recording-paper platen roller, but also movement to change the position of the two movable gears by means of a rotational movement by the cam. This obviates the need to further provide a dedicated motor for changing the position of the two movable gears, and the overall construction of the image processing device is thereby simplified.

The first arm is preferably capable of swinging about an axis formed by a shaft portion, and has a first end portion, on which the first movable gear is provided, and a second end portion that is capable of coming into contact with the cam, and, during reverse rotation of the drive shaft, contact, between the second end portion of the first arm, and the cam, is broken, the first movable gear swings until a position is established in which the first movable gear engages with the cam gear, and the drive force is transmitted to the cam gear. With a constitution of this kind, there is no requirement to especially provide any special device for the transmission of rotational force to the cam or for the halting of rotational force transmission thereto since the first movable gear can be utilized for these purposes.

According to a second aspect of the present invention, another image processing device is provided. This image processing device comprises an original-document platen roller, a recording-paper platen roller, and a drive mechanism, that has a motor, for transmitting the drive force generated by this motor to the original-document platen roller and recording-paper platen roller. This drive mechanism has a first movable gear that is capable of being displaced between a drive position in which the original-document platen roller is driven and a no-drive position in which the original-document platen roller is not driven, and a second movable gear that is capable of being displaced between a drive position in which the recording-paper platen roller is driven and a no-drive position in which the recording-paper platen roller is not driven. Further, the drive mechanism has a switching mechanism that maintains each of the movable gears in the drive positions or the no-drive positions during forward rotation of the motor, or selectively displaces the two movable gears, by means of the motor drive force, between the drive positions and the no-drive positions during reverse rotation of the motor.

According to the present invention, a single motor generates drive force for the rotation of the original-document platen roller and recording-paper platen roller, and for changing the position of the two gears. As a result, the image processing device of the present invention does not need to comprise individual motors for such movements, and the manufacturing costs thereof can thus be reduced.

BEST MODE FOR CARRYING OUT THE INVENTION

A preferred embodiment of the present invention will be explained in concrete terms hereinbelow with reference to the attached figures.

Figure 1:
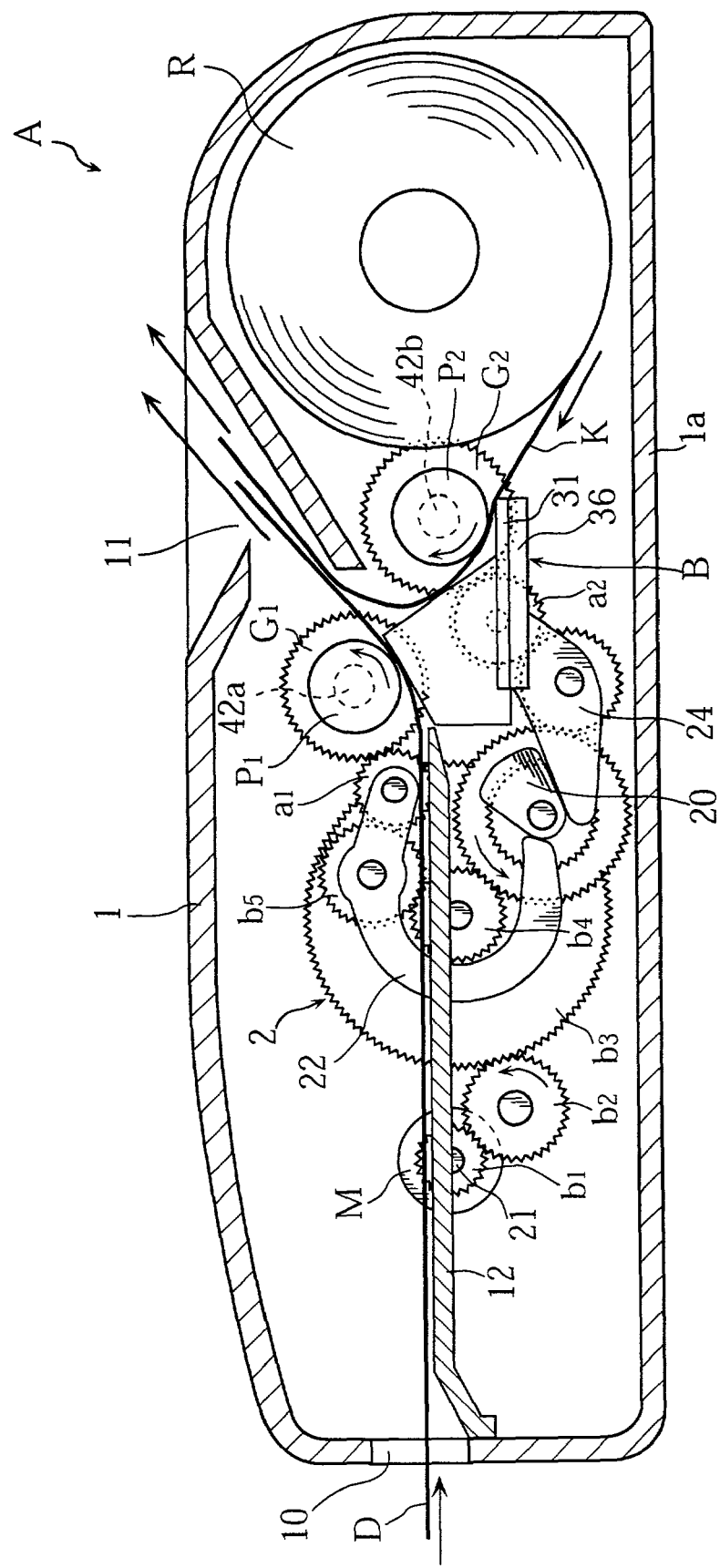
FIG. 1 is a schematic cross-sectional view showing an example of the image processing device relating to the present invention.

As shown in FIG. 1, in a preferred embodiment of the present invention, image processing device A is constituted as a facsimile device. This image processing device A comprises a case unit 1 made from a synthetic resin, an image read/write integrated head B, an original-document platen roller $P_1$ for transporting an original document D, a recording-paper platen roller $P_2$, for transporting recording paper K, and a drive mechanism 2 for driving these two platen rollers.

An original-document insert opening 10 and paper eject opening 11 are formed in the case unit 1. Original document D is inserted in the case unit 1 from the original-document insert opening 10 and guided by a guide plate 12 so as to be interposed between the image read/write integrated head B and the original-document platen roller $P_1$. The original document, which is guided in this manner, is transported towards paper eject opening 11 by means of the rotation of original-document platen roller $P_1$, and ejected from case unit 1. Meanwhile, a space is provided, inside case unit 1, for housing winding roll R, whereon recording paper K is wound. Recording paper K, which is unwound from this winding roll R, is supplied in such a manner as to be interposed between image read/write integrated head B and recording-paper platen roller $P_2$. Recording paper K, which is thus supplied, is transported towards paper eject opening 11 by means of the rotation of recording-paper platen roller $P_2$, and ejected from case unit 1. Paper eject opening 11 may serve as an eject opening for both original document D and recording paper K.

Since this image processing device A is a so-called wall-type facsimile device, during use, bottom 1a of case unit 1 is mounted on a wall such that same faces the surface of a vertical wall. Furthermore, in FIG. 1, original-document insert opening 10 of image processing device A is situated in the left end of case unit 1. However, when this image processing device A is to be disposed on the surface of a wall, original-document insert opening 10 is situated in the top of case unit 1.

Figure 2:
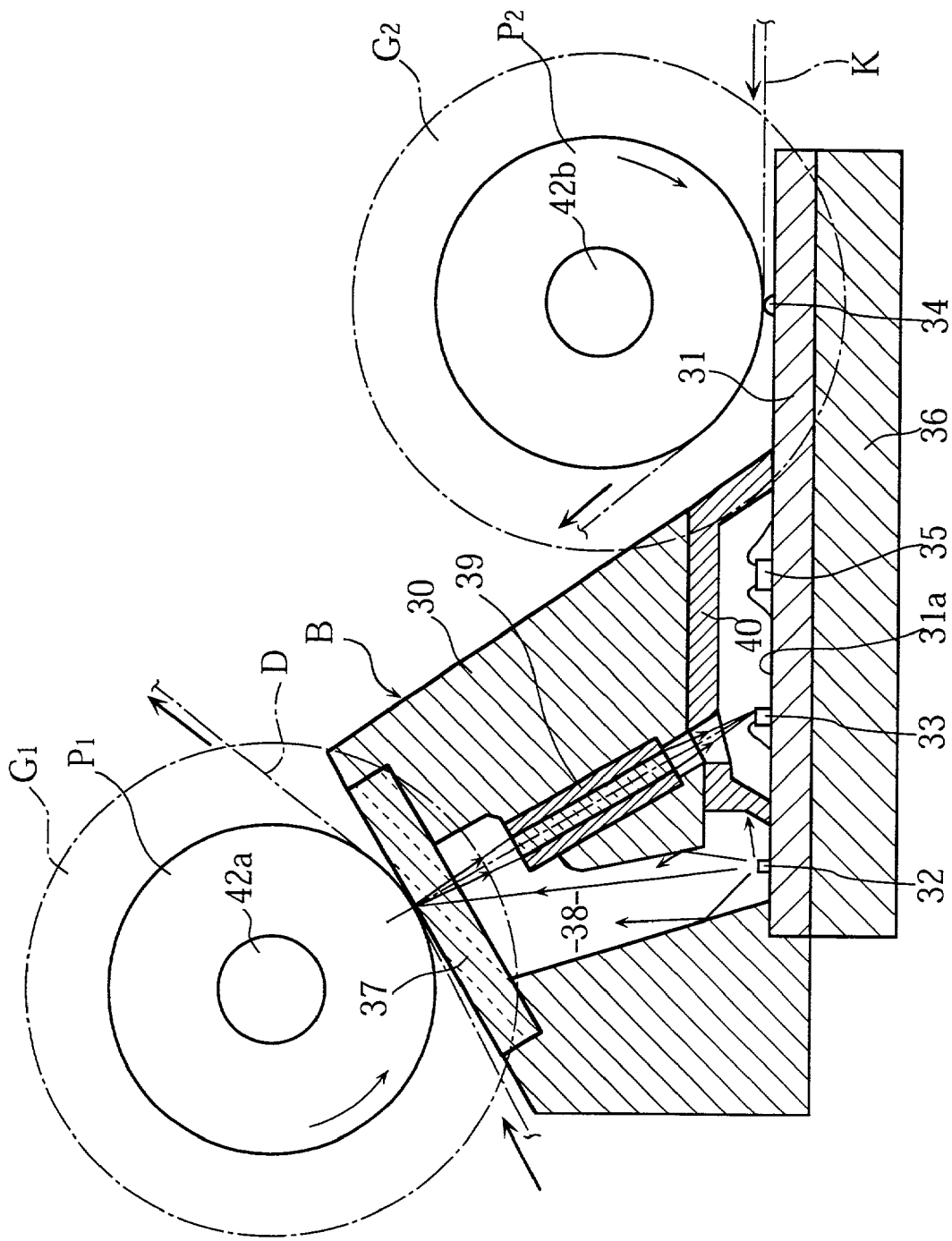
FIG. 2 is a cross-sectional view, with major parts enlarged, of the image processing device shown in FIG. 1.

Meanwhile, image read/write integrated head B functions as a read head that is capable of read-processing of an image on original document D and functions as a thermal print head that is capable of image-print processing on recording paper K. As shown in FIG. 2, image read/write integrated head B comprises a base plate 31 and a case 30 that is provided thereon. In FIG. 2, the direction lengthwise along original-document platen roller $P_1$ and recording-paper platen roller $P_2$ is the main scanning direction. The rear surface 31a (upper surface) of base plate 31 has a plurality of drive ICs 35 mounted thereon for controlling a plurality of light sources 32, a plurality of photoreceptors 33, and a plurality of heating elements 34 that constitute printing elements. The plurality of light sources 32 and plurality of drive ICs 35 are each arranged at suitable intervals in a row shape that extends in the main scanning direction. The plurality of photoreceptors 33 and plurality of heating elements 34 are correspondingly each arranged in close formation in a row shape that extends in the main scanning direction. A plurality of LEDs may be used, for example, as the plurality of light sources 32. However, another kind of light source may also be employed for light sources 32. The plurality of photoreceptors 33 have a photoelectric pickup function and output image signals for an output level that varies in accordance with the amount of light received. The plurality of heating elements 34 are the same kind of heating elements used in a typical thermal print head. Each of a plurality of drive ICs 35 is used to control the plurality of heating elements 34 for each individual dot. By means of this control, the plurality of heating elements 34 generate heat under the control for each individual dot. In the present embodiment, the plurality of heating elements 34 and plurality of drive ICs 35 are separately provided on base plate 31, however, in another embodiment, same may be formed integrally and provided on base plate 31. A radiation plate 36 is provided on the rear face of base plate 31.

Case 30 is provided on base plate 31 so as to cover the plurality of light sources 32, plurality of photoreceptors 33 and plurality of drive ICs 35, but not the plurality of heating elements 34. Case 30 comprises, on the upper face thereof, a transparent plate 37 that is light-transmissive, and original-document platen roller $P_1$ is provided facing the surface of this transparent plate 37. Meanwhile, recording-paper platen roller $P_2$ is provided facing the plurality of heating elements 34 that are in a row shape and exposed on base plate 31. Original-document platen roller $P_1$ and recording-paper platen roller $P_2$ have shaft portions 42a, 42b respectively provided at both ends of each of these respective platen rollers. These shaft portions 42a, 42b are supported by members (not shown) that are fixed with respect to case unit 1. Consequently, original-document platen roller $P_1$ and recording-paper platen roller $P_2$ can rotate in a set position. Driven gear $G_1$ and $G_2$ are respectively mounted on shaft portions 42a, 42b, and, as described above, these driven gears respectively serve to transmit the rotational force from drive mechanism 2 to original-document platen roller $P_1$ and recording-paper platen roller $P_2$.

A light path, used for illumination, 38 is formed inside case 30. The light generated by the plurality of light sources 32 passes along within this illumination light path 38 and irradiates transparent plate 37 and original document D, which has been supplied onto transparent plate 37 by original-document platen roller $P_1$. A lens array 39 is provided inside case 30. This lens array 39 focuses the light reflected from original document D, which has been supplied onto transparent plate 37, and permits the formation of an image on photoreceptors 33. Due to the fact that lens array 39 comprises multiple image lenses, which are juxtaposed in the main scanning direction, an image representing one line of original document D, in the main scanning direction, is formed on the plurality of photoreceptors 33. Further, when the plurality of photoreceptors 33 receive the light focused by the lens array 39, same output image signals for an output level that varies in accordance with the amount of light received. The plurality of photoreceptors 33, along with drive ICs 35, is covered by a black light shielding member, which is provided inside case 30. As a result, light from outside case 30 and, in addition, an excessive incidence of scattered light on the plurality of photoreceptors, can be prevented.

Figure 3:
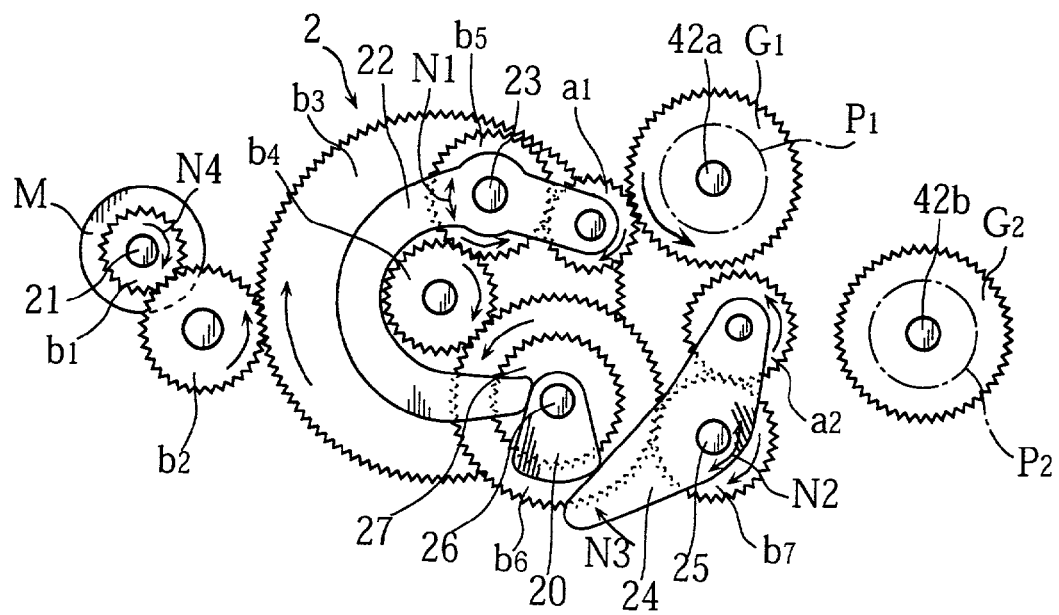
FIG. 3 is a side view showing the drive mechanism of the image processing device shown in FIG. 1.

Referring to FIG. 3, drive mechanism 2 comprises a motor M, a first movable gear $a_1$, a second movable gear $a_2$, a driving gear $b_1$, a plurality of intermediate gears $b_2$ to $b_7$, a cam 20, a first arm 22, and a second arm 24.

First movable gear $a_1$ is constituted so as to be capable of engaging directly with driven gear $G_1$ of original-document platen roller $P_1$, and second movable gear $a_2$ is constituted so as to be capable of engaging directly with driven gear $G_2$ of recording-paper platen roller $P_2$ As a result, original-document platen roller $P_1$ and recording-paper platen roller $P_2$ are caused to rotate directly by first movable gear $a_1$ and second movable gear $a_2$ respectively.

Motor M is one example of a drive source according to the present invention, and has a drive shaft 21 that is capable of rotating in either direction. When drive shaft 21 rotates as shown by the arrow N4, the rotational force thereof is transmitted, via an intermediate gear $b_2$, from driving gear $b_1$, which is mounted on this drive shaft 21, to an intermediate gear $b_3$, and in turn, an intermediate gear $b_4$, which is provided so as to be integral with intermediate gear $b_3$, rotates. The rotational force of intermediate gear $b_4$ is continually transmitted to first movable gear $a_1$ via an intermediate gear $b_5$, and transmitted to second movable gear $a_2$ via intermediate gears $b_6$, $b_7$. Consequently, when drive shaft 21 rotates as shown by the arrow N4, first movable gear $a_1$ and second movable gear $a_2$ continually rotate.

Figure 4:
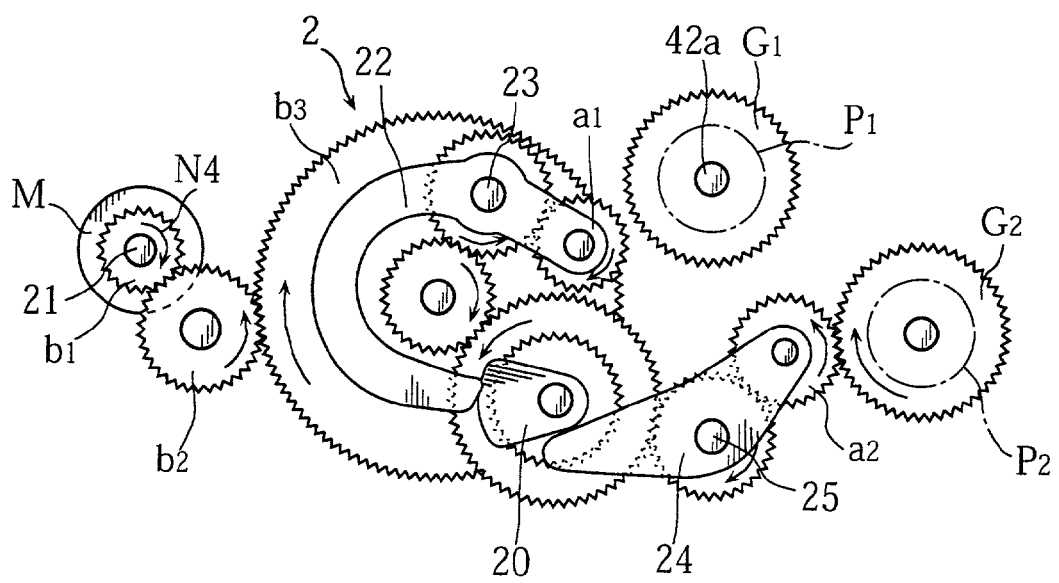
FIG. 4 is a side view illustrating movement of the drive mechanism shown in FIG. 3.
Figure 5:
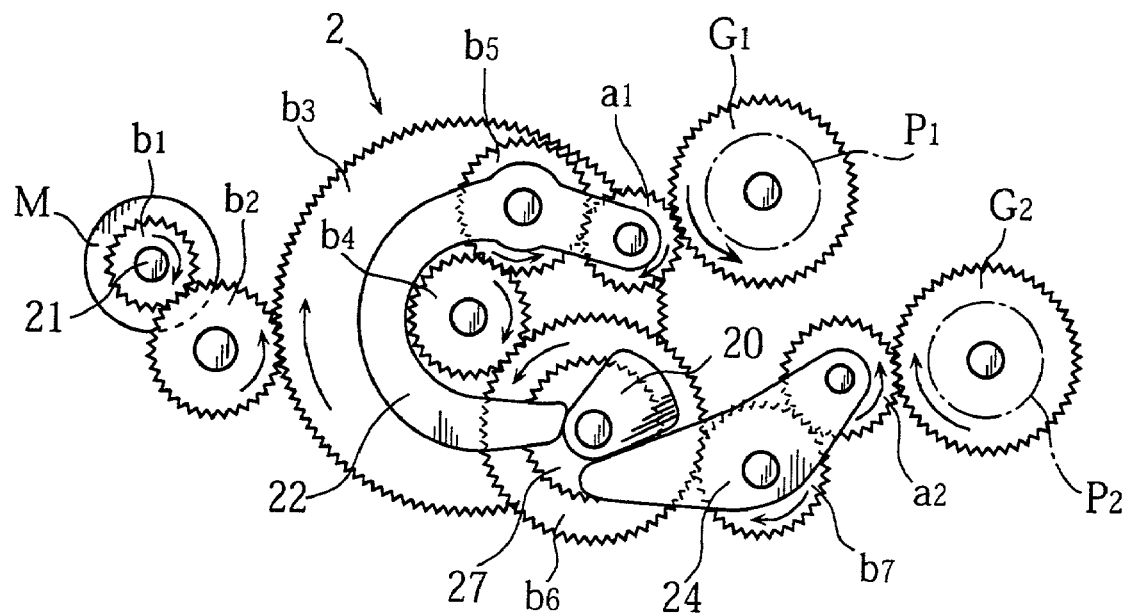
FIG. 5 is a side view illustrating further movement of the drive mechanism shown in FIG. 3.
Figure 6:
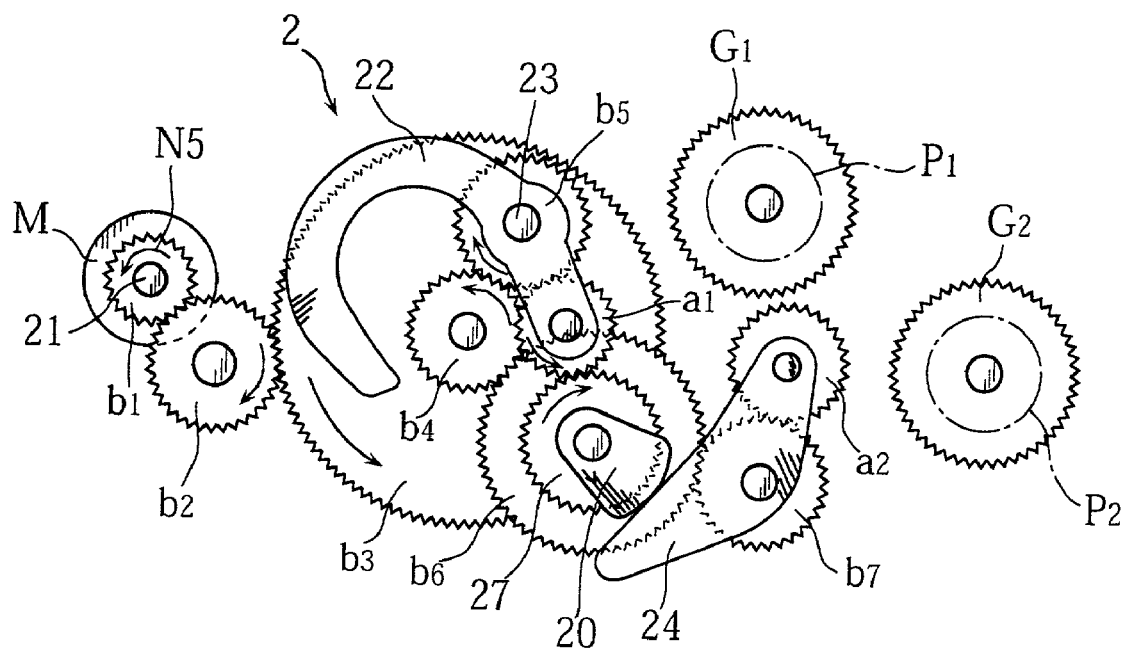
FIG. 6 is a side view illustrating further movement of the drive mechanism shown in FIG. 3.
Figure 7:
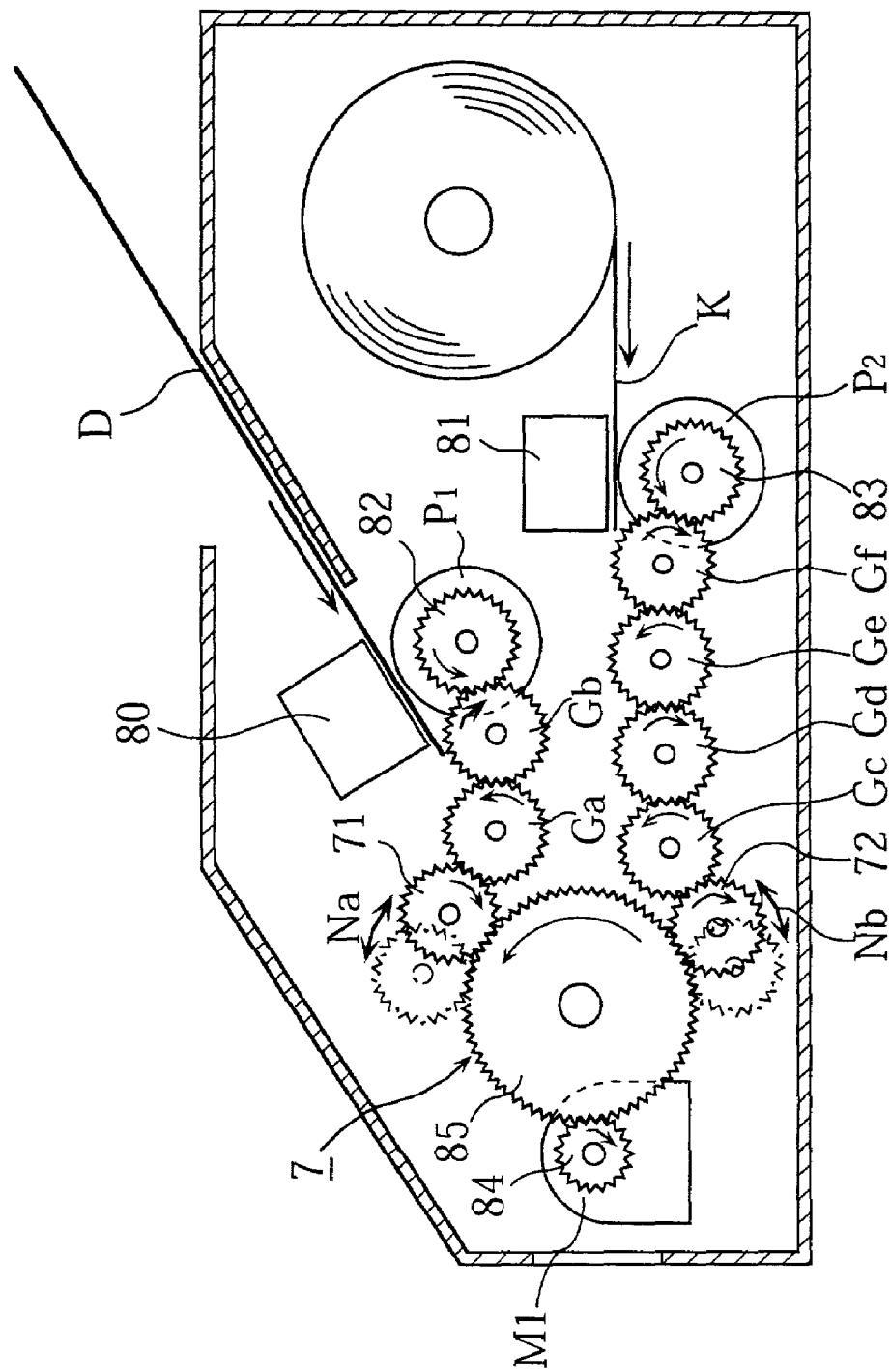
FIG. 7 is a schematic cross-sectional view showing an example of a conventional image processing device.

First movable gear $a_1$ is supported by one end of a first arm 22 that is capable of swinging, as shown by the arrow N1, about a fixed shaft 23 which also serves as the axis of intermediate gear $b_5$. Since first arm 22 is provided so as to be capable of swinging, first movable gear $a_1$ is capable of moving to a position in which same comes into contact with and engages with driven gear $G_1$ of original-document platen roller $P_1$, as shown in FIGS. 3 and 5, or to a position in which first movable gear $a_1$ is moved away from driven gear $G_1$, as shown in FIGS. 4 and 6.

The second movable gear $a_2$ is supported by one end of a second arm 24 that is capable of swinging, as shown by the arrow N2, about the fixed shaft 25 which also serves as the axis of an intermediate gear $b_7$. Since second arm 24 is provided so as to perform a swinging movement, second movable gear $a_2$ is capable of moving to a position in which same comes into contact with and engages with driven gear $G_2$ of recording-paper platen roller $P_2$, as shown in FIGS. 4 and 5, or to a position in which second movable gear $a_2$ is moved away from driven gear $G_2$, as shown in FIGS. 3 and 6. The number of gears between intermediate gear $b_4$ and second movable gear $a_2$ is different from the number of gears between intermediate gear $b_4$ and first movable gear $a_1$. This difference exists in the present embodiment due to the requirement for first movable gear $a_1$ and second movable gear $a_2$ to rotate in mutually opposite directions, since original-document platen roller $P_1$ and recording-paper platen roller $P_2$ are caused to rotate in mutually opposite directions.

Cam 20 is a member for changing the position of first movable gear $a_1$ and second movable gear $a_2$ by establishing positions for first arm 22 and second arm 24. Cam 20 is provided so as to rotate with a rotatable gear 27 about an axis formed by fixed shaft 26. Gear 27 is provided on fixed shaft 26, which is common to gear 27 and an intermediate gear $b_6$, but so as to be separate from intermediate gear $b_6$. Intermediate gear 27 is thus capable of rotation about fixed shaft 26, along with cam 20 and independently of intermediate gear $b_6$. More specifically, as shown in FIG. 6, first arm 22 swings about fixed shaft 23, and gear 27 rotates only when rotational force is transmitted by first movable gear $a_1$, which is provided on one end of arm 22, to gear 27 through engagement therewith. Further, cam 20 rotates along with the rotational movement of this gear 27. Cam 20 is formed substantially in the shape of a fan, for example, and has an end face and a face on both sides. These faces are intended to constitute cam faces which come into contact with the other end of each of first arm 22 and second arm 24. As shown in FIGS. 3 through 5, when intermediate gear $b_4$ rotates clockwise, intermediate gear $b_5$ rotates counterclockwise; the other end of first arm 22 thus turns counterclockwise about an axis formed by fixed shaft 23, in the same way as intermediate gear $b_5$, so as to come into contact with cam 20. Correspondingly, as shown in FIG. 6, when intermediate gear $b_4$ rotates counterclockwise, intermediate gear $b_5$ rotates clockwise; the other end of first arm 22 thus turns clockwise about an axis formed by fixed shaft 23 so as to move away from cam 20. First movable gear $a_1$ then approaches and engages with gear 27. Meanwhile, second arm 24 is biased, as shown by arrow N3 in FIG. 3, by an elastic member such as a spring, such that the other end of second arm 24 remains in continual contact with cam 20.

When image processing device A is to perform only read-processing of an image on original document D, an attitude is established for cam 20 of drive mechanism 2, as shown in FIG. 3. Control of the attitude of cam 20 will be discussed hereinbelow. Drive shaft 21 of motor M is caused to rotate as shown by arrow N4. In the present embodiment, arrow N4 indicates forward rotation of drive shaft 21.

When drive shaft 21 of motor M rotates forwards, intermediate gear $b_5$ rotates counterclockwise as a result. At the same time, first arm 22 also rotates counterclockwise about an axis formed by fixed shaft 23 until the other end of first arm 22 comes into contact with one side face of cam 20. By establishing a position, for the other end of first arm 22, at which same comes into contact with one side face of cam 20, first movable gear $a_1$, which is provided at one end of first arm 22, is disposed in a position at which engagement with driven gear $G_1$ takes place. First movable gear $a_1$, which is then rotating clockwise, then transmits rotational force to driven gear $G_1$. As a result, the original-document platen roller rotates counterclockwise, thereby transporting original document D in a predetermined direction. Thereupon, as shown in FIG. 2, light sources 32, lens array 39, and the plurality of photoreceptors 33, of image read/write integrated head B, are utilized, and read-processing of an image on original document D is thus achieved. Meanwhile, as shown in FIG. 3, in this read-processing of an image on original document D, the attitude of second arm 24 is also controlled by cam 20 such that second movable gear $a_2$, which is provided at one end of second arm 24, is disposed in a position at which engagement with driven gear $G_2$ does not take place. Consequently, contact of recording-paper platen roller $P_2$ with drive mechanism 2 is broken, meaning that recording-paper platen roller $P_2$ does not rotate during image read-processing.

When image processing device A is to perform only print-processing on recording paper K, an attitude is established for cam 20 of drive mechanism 2, as shown in FIG.

4. Drive shaft 21 of motor M is caused to rotate forwards, as during image read-processing.

When an attitude is established for cam 20, as shown in FIG. 4, the end face of cam 20 comes into contact with the other end of first arm 22. As a result, a position is established, for first arm 22, that is rotationally forward of that shown in FIG. 3, in a clockwise direction, and first movable gear $a_1$, which is provided at one end of the first arm, is thus disposed in a position at which engagement with driven gear $G_1$ does not take place. Consequently, contact of original-document platen roller $P_1$ with drive mechanism 2 is broken, meaning that original-document platen roller $P_1$ does not rotate during print-processing. Meanwhile, as a result of coming into contact with one side face of cam 20, the other end of second arm 24 is established in a position that is rotationally forward of that shown in FIG. 3 in a clockwise direction. As a result, second movable gear $a_2$, which is provided at one end of second arm 24, is disposed so as to engage with driven gear $G_2$. As a consequence of the forwards rotation of drive shaft 21 of motor M, second movable gear $a_2$ rotates counterclockwise, transmitting rotational force to driven gear $G_2$. This leads the recording-paper platen roller to rotate clockwise, thereby transporting recording paper K in a predetermined direction. Thereupon, as shown in FIG. 2, the plurality of heating elements 34 and plurality of drive ICs 35, of image read/write integrated head B, are utilized, and print-processing on recording paper K is thus achieved.

When image processing device A is to perform read-processing of an image on original document D and print-processing on recording paper K at the same time, an attitude is established for cam 20 of drive mechanism 2, as shown in FIG. 5, and drive shaft 21 of motor M is made to rotate forwards.

When such an attitude is established for cam 20, as shown in FIG. 5, first arm 22 and second arm 24 come into contact with side faces of cam 20. Since a position is established, for first arm 22, that is the same as that shown in FIG. 3, first movable gear $a_1$ is disposed in a position at which engagement with driven gear $G_1$ takes place. At the same time, since a position is established, for second arm 24, that is the same as that shown in FIG. 4, second movable gear $a_2$ is disposed in a position at which engagement with driven gear $G_2$ takes place. As a result, original-document platen roller $P_1$ and recording-paper platen roller $P_2$ rotate at the same time, thereby transporting original document D and recording paper K in predetermined directions. Thereupon, as shown in FIG. 2, the plurality of light sources 32, lens array 39, plurality of photoreceptors 33, plurality of heating elements 34, and plurality of drive Is 35, of image read/write integrated head B, are utilized, and read-processing of an image on original document D and print-processing of this image on recording paper K are achieved simultaneously. FIG. 6 shows movement performed by drive mechanism 2 in order to change the attitude of cam 20 of drive mechanism 2 by causing drive shaft 21 of motor M to rotate in reverse. When drive shaft 21 is caused to rotate in reverse, as shown by arrow N5, intermediate gear $b_5$ rotates clockwise. This causes first arm 22 to rotate clockwise about an axis formed by fixed shaft 23, and first movable gear $a_1$, which is provided at one end of first arm 22, is established in a position in which engagement with intermediate gear 27 takes place. As a result of first movable gear $a_1$ transmitting rotational force to intermediate gear 27, intermediate gear 27 and cam 20, which is fixed thereto, rotate clockwise, and the attitude of cam 20 is thus changed. At that time, first movable gear $a_1$ engages only with intermediate gear $b_5$ and intermediate gear 27, and not with intermediate gear $b_4$. Further, since intermediate gear 27 rotates independently of intermediate gear $b_6$, cam 20 also rotates independently of intermediate gear $b_6$, the attitude of cam 20 being thus controlled. The other end of first arm 22 moves away from cam 20, meaning that the rotational movement of cam 20 is not impeded. Second arm 24 comes into contact with cam 20, but since contact is made such that the second arm receives, via a smooth side face thereof, a spring bias member that is on the cam, second arm 24 does not stop the rotation of cam 20 either. The angle of rotation of cam 20 is matched to the angle of rotation of intermediate gear 27, and corresponds to the angle of rotation of drive shaft 21 of motor M. Consequently, by controlling the angle of rotation when the drive shaft 21 is caused to rotate in reverse, and by means of first movable gear $a_1$, an attitude for cam 20 can be easily established that is equal to any of the attitudes in FIGS. 3 through 5 as discussed above. In order to precisely control the angle of rotation, a sensor may be provided for detecting the attitude of cam 20 (the phase thereof), thus making it possible to control the angle of rotation of drive shaft 21 of motor M while detecting the actual attitude (phase) of cam 20 by using this sensor.

In the image processing device A of the present embodiment, first movable gear $a_1$ and second movable gear $a_2$ are provided, not in the middle of drive mechanism 2, but instead at the end thereof, so as to be capable of engaging directly with original-document platen roller $P_1$ and recording-paper platen roller $P_2$ With a constitution of this kind, it is possible to provide a drive mechanism 2 that is designed to be disposed between large-diameter intermediate gear $b_3$, first movable gear $a_1$, and second movable gear $a_2$. In concrete terms, in drive mechanism 2, a plurality of components, which serve to transmit motive power to original-document platen roller $P_1$ and recording-paper platen roller $P_2$ when motor M is rotating forwards, also serve to displace first movable gear $a_1$ and second movable gear $a_2$, simply by motor M rotating in reverse, and by the motive power transmission function being halted. Also, since first movable gear $a_1$ and second movable gear $a_2$ are positioned at the end of the drive mechanism, the motive power transmission path of the drive mechanism is not obstructed at any point therealong as a result of the displacement of the two movable gears. Consequently, substantially all the components of the drive mechanism are used in conjunction with one another in order to achieve the motive power transmission function and displacement function. In order to achieve a good level of efficiency for the motive power transmission function and the displacement function, according to the present invention, there is no requirement to especially provide any components other than those serving to transmit motive power, or to provide a motor for driving such additional components. Further, on account of the provision of first movable gear $a_1$ and second movable gear $a_2$ at the end of drive mechanism 2, gears, as required conventionally, between first movable gear $a_1$ and driven gear $G_1$, and between second movable gear $a_2$ and driven gear $G_2$, are no longer essential components. As a result, the total number of gears required by the image processing device can be reduced, thus permitting a reduction in the manufacturing costs thereof.

Furthermore, in the image processing device A of the present embodiment, since the original-document platen roller $P_1$ and recording-paper platen roller $P_2$ are both arranged on the same side of base plate 31 of image read/write integrated head B, it is possible for these platen rollers to be disposed close to one another. In other words, the interval between the shafts of respective driven gears $G_1$, $G_2$ thereof can be made short. As a result, the manufacture of a construction that permits the first movable gear $a_1$ and second movable gear $a_2$ of drive mechanism 2 to engage directly with driven gears $G_1$, $G_2$, is straightforward. Further, since the interval between the shafts of driven gears $G_1$, $G_2$ is short, it is possible to also make short the interval between the shafts of first movable gear $a_1$ and second movable gear $a_2$, whereby it becomes possible to make the overall size of drive mechanism 2 compact.

In the image processing device A of the present embodiment, by switching the rotation of drive shaft 21 of motor M to forward or reverse, the movements for the displacement of first movable gear $a_1$ and second movable gear $a_2$, and the rotational movements of original-document platen roller $P_1$ and recording-paper platen roller $P_2$ may be performed individually. The drive mechanism 2 of the present embodiment is provided with a streamline constitution for achieving such movements. However, the actual constitution of drive mechanism 2 is not limited to this constitution. For example, a one-way clutch may be employed as a means for changing the positions of the first movable gear and second movable gear through the reverse rotational movement of the motor drive shaft. When the drive mechanism comprises a one-way clutch of this kind, a constitution is possible such that rotational force of the motor is transmitted to the cam only during reverse rotation of the drive shaft of the motor, it being possible to establish a suitable attitude for the cam by causing same to rotate through a desired angle.

In addition, the actual constitution of each of the parts of the image processing device relating to the present invention can be modified according to a variety of designs. The image processing device according to the present invention need not necessarily be constituted in the form of a facsimile device provided with an image-conveyance function. Further, the image processing device according to the present invention need not necessarily be provided with a function for copying original documents.

What is claimed is:

1. An image processing device, comprising:
   an original-document platen roller that has a first driven gear and is for transporting an original document;
   a recording-paper platen roller that has a second driven gear and is for transporting recording paper; and
   a drive mechanism that has a first movable gear, a second movable gear, and a drive source and is for transmitting a drive force generated by this drive source to the first driven gear and second driven gear;
   wherein the first movable gear is provided so as to be capable of engaging directly with the first driven gear, and the second movable gear is provided so as to be capable of engaging directly with the second driven gear.

2. The image processing device according to claim 1, further comprising an image read/write integrated head, in which a plurality of photoreceptors for reading an original-document image, and a plurality of printing elements for performing image printing are mounted on a same side of a same base plate, and wherein said original-document platen roller is provided facing said plurality of photoreceptors, and said recording-paper platen roller is provided facing said plurality of printing elements.

3. The image processing device according to claim 1, wherein said drive mechanism comprises a switching mechanism that selectively causes said first movable gear and said second movable gear to engage with said first driven gear and said second driven gear.

4. The image processing device according to claim 3, wherein said switching mechanism permits a mode in which said first movable gear is caused to engage with said first driven gear, and said second movable gear is simultaneously moved away from said second driven gear.

5. The image processing device according to claim 3, wherein said switching mechanism permits a mode in which said second movable gear is caused to engage with said second driven gear, and said first movable gear is simultaneously moved away from said first driven gear.

6. The image processing device according to claim 3, wherein said switching mechanism permits a mode in which said first movable gear is caused to engage with said first driven gear, and said second movable gear is simultaneously caused to engage with said second driven gear.

7. The image processing device according to claim 3, wherein said switching mechanism comprises a cam that has a cam gear for receiving drive force from said drive source; a first arm that is provided so as to be capable of coming into contact with said cam and on which said first movable gear is mounted; a second arm that is provided so as to be capable of coming into contact with said cam and on which said second movable gear is mounted, and wherein said cam establishes a position of said first movable gear and second movable gear through contact with said first arm and said second arm.

8. The image processing device according to claim 7, wherein said first arm is capable of swinging about an axis formed by a shaft portion, and has a first end portion, on which said first movable gear is provided, and a second end portion that is capable of coming into contact with said cam.

9. The image processing device according to claim 7, wherein said second arm is capable of swinging about an axis formed by a shaft portion, and has a first end portion, on which said second movable gear is provided, and a second end portion that is capable of coming into contact with said cam.

10. The image processing device according to claim 9, wherein the second end portion of the second arm remains in continual contact with said cam by means of pring bias.

11. The image processing device according to claim 7, wherein said drive source is a motor that has a drive shaft capable of forward and reverse rotation, and said switching mechanism causes the cam to rotate, without transmitting drive force of said motor to said cam gear during forward rotation of said drive shaft, or transmitting said drive force to said cam gear during reverse rotation of said drive shaft.

12. The image processing device according to claim 11, wherein said first arm is capable of swinging about an axis formed by a shaft portion, and has a first end portion, on which said first movable gear is provided, and a second end portion that is capable of coming into contact with said cam, and wherein, during reverse rotation of said drive shaft, contact, between said second end portion of said first arm, and said cam, is broken, said first movable gear swings until a position is established in which said first movable gear engages with said cam gear, and said drive force is transmitted to said cam gear.

* * * * *